United States Patent
Hohl et al.

(10) Patent No.: US 10,334,285 B2
(45) Date of Patent: Jun. 25, 2019

(54) APPARATUS, SYSTEM AND METHOD

(71) Applicant: Sony Corporation, Tokyo (JP)

(72) Inventors: Fritz Hohl, Stuttgart (DE); Thomas Kemp, Esslingen (DE)

(73) Assignee: SONY CORPORATION, Tokyo (JP)

( * ) Notice: Subject to any disclaimer, the term of this patent is extended or adjusted under 35 U.S.C. 154(b) by 10 days.

(21) Appl. No.: 15/042,482

(22) Filed: Feb. 12, 2016

(65) Prior Publication Data

US 2016/0247423 A1 Aug. 25, 2016

(30) Foreign Application Priority Data

Feb. 20, 2015 (EP) .................................. 15155994

(51) Int. Cl.
| | | |
|---|---|---|
| G09F 9/302 | (2006.01) | |
| H04N 21/234 | (2011.01) | |
| H04N 21/845 | (2011.01) | |
| H04N 21/81 | (2011.01) | |
| H04N 21/8358 | (2011.01) | |
| H04N 21/858 | (2011.01) | |
| G11B 27/036 | (2006.01) | |
| G11B 27/30 | (2006.01) | |

(52) U.S. Cl.
CPC ..... *H04N 21/23418* (2013.01); *G11B 27/036* (2013.01); *G11B 27/3009* (2013.01); *H04N 21/812* (2013.01); *H04N 21/8358* (2013.01); *H04N 21/8455* (2013.01); *H04N 21/8583* (2013.01)

(58) Field of Classification Search
USPC .................................................. 386/239–260
See application file for complete search history.

(56) References Cited

U.S. PATENT DOCUMENTS

| | | | |
|---|---|---|---|
| 6,411,725 B1 * | 6/2002 | Rhoads ............. | G06F 17/30876 375/E7.089 |
| 6,973,130 B1 * | 12/2005 | Wee .......................... | G06T 9/20 375/240.08 |
| 7,231,651 B2 | 6/2007 | Pong | |
| 8,752,087 B2 | 6/2014 | Begeja et al. | |
| 2003/0012548 A1 * | 1/2003 | Levy ...................... | G06F 21/125 386/251 |
| 2011/0213664 A1 | 9/2011 | Osterhout et al. | |
| 2012/0066589 A1 * | 3/2012 | Santos .................. | G06F 3/1243 715/255 |
| 2012/0078689 A1 | 3/2012 | Rothschild | |
| 2012/0177130 A1 * | 7/2012 | Levy ................ | H04N 21/44008 375/240.25 |
| 2012/0272279 A1 * | 10/2012 | Lim .................. | H04N 21/23892 725/109 |

(Continued)

OTHER PUBLICATIONS

Juan Camilo Zuniga Zemanate et al. "Detection of Advertising Spaces from Audiovisual Scenes to Product Placement", S & T Magazine, vol. 12, No. 28, 2014, 1 page (English Abstract Only).

(Continued)

*Primary Examiner* — Hung Q Dang
(74) *Attorney, Agent, or Firm* — Xsensus LLP (57) ABSTRACT

An apparatus comprising a watermark decoder arranged for decoding a watermark signal from a transmission video signal, the watermark signal defining a content area within the transmission video signal for inserting new content within the transmission video signal.

29 Claims, 11 Drawing Sheets

(56) References Cited

U.S. PATENT DOCUMENTS

2015/0206172 A1* 7/2015 Lefevre ............ H04N 21/23424
705/14.41

OTHER PUBLICATIONS

"TV Technology Glossary" URL: http://www.thinkbox.tv/tv-technology-glossary, Sep. 29, 2014, 26 pages.
G. Medioni et al. "Real-Time Billboard Substitution in a Video Stream", Multimedia Communications, 1999, 14 pages.
Ruediger Kays "Visible Light Communications Using TV Displays and Video Cameras", 2015 IEEE International Conference on Consumer Electronics (ICCE), 2015, 2 pages.

* cited by examiner

APPARATUS, SYSTEM AND METHOD

TECHNICAL FIELD

The present disclosure generally pertains to the field of video recording and video playback, in particular to apparatus, systems and methods for encoding and decoding a watermark signal within a video image.

TECHNICAL BACKGROUND

The content of a traditional billboard is determined by the content shown at recording time. The more the playback time is away from the recording time, the more outdated the billboard content will appear to a viewer. Additionally, traditional billboards offer no real personalization which make them inefficient.

Methods and systems are known which analyze video content to identify objects within the video content, and which replace selected identified objects by other objects. For example, it is known to identify blank segments or other objects within video scenes and replace the blank segments by advertisements.

However, identifying objects suitable for placing advertisements within a video scene may require image recognition means and may be thus be a technical complex task.

SUMMARY

Thus, although there exist techniques for determining areas in a video signal for inserting new content within the video signal, it is generally desirable to provide alternative apparatus, systems and methods for determining areas in a video signal for inserting new content within the video signal.

According to a first aspect the disclosure provides an apparatus comprising a watermark decoder arranged for decoding a watermark signal from a transmission video signal, the watermark signal defining a content area within the transmission video signal for inserting new content within the transmission video signal.

According to a second aspect the disclosure provides an apparatus comprising a watermark encoder arranged for encoding a watermark signal into a content video signal to obtain a display video signal, the watermark signal defining a content area within the content video signal for inserting new content into the content video signal According to a third aspect the disclosure provides a method comprising decoding a watermark signal from a transmission video signal, the watermark signal defining a content area within the transmission video signal for inserting new content within the transmission video signal.

According to a fourth aspect the disclosure provides a method comprising encoding a watermark signal into a content video signal to obtain a display video signal, the watermark signal defining a content area within the content video signal for inserting new content into the content video signal.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

In the following embodiments it is described an apparatus comprising a watermark decoder arranged for decoding a watermark signal from a transmission video signal, the watermark signal defining a content area within the transmission video signal for inserting new content within the transmission video signal.

The apparatus may be any device capable of playing video, such as a television device, a DVD player, a recording device, a multimedia station, a personal computer, a smartphone, a tablet computer, a smart watch, a camera device, augmented reality products such as head mounted displays, or the like.

The watermark decoder may be implemented as software designed for running on a processor. Alternatively, the watermark decoder may be directly implemented as hardware.

The transmission video signal may be transmitted by a broadcasting station, e.g. via a digital television broadcast station, or via the Internet. Alternatively, the transmission video signal may be a video signal that is read from a video storage medium such as DVD or a harddisk device.

A transmission video signal may comprise a series of video frames, each video frame being one of many still images which compose a complete moving picture.

The content area defined by the watermark signal may be any part or section of a video frame.

The content area defined by the watermark signal may for example indicate an object within the transmission video signal. If an object is moving, the content area may change with every video frame according to the position of the moving object.

The content area defined by the watermark signal may for example indicate the area in a video frame that is occupied by a billboard represented in the video content.

The content area defined by the watermark signal may be a marked area inside a larger unmarked video where the marked area can be arbitrarily oriented in 3D. The watermark may thus be arranged in such a way that it allows orientation of the content area.

In cases where the content area can be defined by the boundary of the area, the watermark signal may define the content area by defining the boundary of the content area.

The watermark signal may be invisible or substantially invisible for a user watching the transmitted video signal.

The watermark signal may be arranged in such a way that it cannot be removed from the video signal by accident.

The watermark signal may also comprise steganographic watermarks. This may prevent also intentional removal of the watermark signal from the video signal.

The apparatus may further comprise a content inserter arranged for inserting the new content at the content area defined by the watermark signal.

The new content may be obtained from a content provider which hosts a content database. To this end, the apparatus may be connected to the content provider via a network connection. The content database may for example be located in the Internet.

The new content may for example be images with a better quality (e.g. resolution). In particular, the new content may replace original content within the transmitted video signal.

The new content may for example be an advertisement. In this regard, the content area defined by the watermark signal can be considered as a virtual billboard.

The new content may be still images or animated images. Inserting animated images may for example be helpful in situations where (in the original location) of the original content animation is not possible or not adequate.

The new content may also be current advertisements which replace old advertisements.

The new content may also be advertisements which are localized to the location-of-view, e.g. using the local language at the location-of-view or the language setting of a display device.

Still further, the new content may be advertisements of a different company (e.g. for sub-letting adspace e.g. after a campaign was finished or as the technical platform for dynamic adspace selling).

The content inserter may be arranged in such a way that new content is only inserted if the owner of the original content and the owner of the new content have agreed to do so.

The content inserter may further be arranged in such a way that it allows orientation of the new content so that the new content fits to the content area indicated by the watermark signal.

The watermark signal may comprise content area meta information.

The watermark decoder may for example apply a visual light communication (VLC) demodulation scheme. Different modulation/demodulation schemes can be used to overlay the content video with a data signal layer. Such modulation/demodulation schemes are described in more detail below with regard to a watermark encoder which produces the watermark signal.

The content area meta information may for example be encoded according to a visual light communication (VLC) demodulation scheme as described above.

According to an embodiment, the content area meta information may be encoded as a QR code. The QR code can be read from the transmission video signal by demodulating the transmission video signal according to one of the demodulation schemes mentioned above.

The content area meta information may comprise information that allows to identify the owner of an advertisement or ad space.

Based on the content area meta information, the watermark encoder may thus allow to recognize billboards of an ad owner in a video image. A space of a billboard in the content video signal may thus be replaced by some other content of the ad owner.

Further, the content area meta information may bear static data.

Still further, the content area meta information may bear dynamic data. For example, the watermark may not be the same for every frame, but can also change in order to achieve a higher watermark data rate in time. This may be achieved by using a 3D barcode instead of a 2D barcode.

The apparatus may further comprise a content manager arranged for selecting the new content based on the content area meta information.

The content area meta information may be encoded by means of a 2D barcode scheme, for example as a QR code. QR encoding/decoding schemes are well known to the skilled person. For example, the QR coding scheme according ISO/IEC standard 18004:2006 ("QR-Code 2005") may be used. Alternatively, 3D codes may be used in the same manner. A 3D barcode may be a series of 2D barcodes (for example a series of QR codes) which change in time. That is, a 3D barcode can for example be seen as a kind of "barcode movie" where every n-th frame of the QR-code is different. As already described above, the use of such 3D barcodes may increase the codes ability to bear dynamic data.

The content manager may further be arranged for selecting the new content based on user context information. The new content may thus be personalized advertisements using actual knowledge about the viewers stored in the user context information. The user context information may for example be stored in a user context database.

The user context database may be located within the playback device.

Alternatively, the user context database may be located at a central location, for example on a server of a content provider to which the apparatus is connected.

In the following embodiments it is also described an apparatus comprising a watermark encoder arranged for encoding a watermark signal into a content video signal to obtain a display video signal, the watermark signal defining a content area within the content video signal for inserting new content into the content video signal.

The display video signal may for example be displayed on a signage display. The signage display may for example be a billboard which is designed to display advertisements.

The display video signal, when displayed on a signage display, may produce a displayed video that can be captured by a camera device. For example, if during a sports event, advertisements are shown on a signage display, the watermark encoder can be arranged to insert a watermark signal in the content video signal transmitted to the signage display. The watermark signal may be invisible to the spectators watching the signage display. The spectators thus only see the original content video carried by the content video signal before insertion of the watermark signal. However, if a camera is pointed at the signage display, the camera may capture the displayed video which comprises both the original content video and the watermark signal. That is, the watermark signal, although not being visible (or being substantially invisible) to a user may nevertheless be captured by a camera device and may be retrieved by a watermark decoder as described above with regard to the apparatus comprising a watermark decoder.

The watermark encoder may for example apply a visual light communication (VLC) modulation scheme to generate the watermark signal and insert the watermark signal into a content video signal. Different modulation schemes can be used to overlay the content video with a data signal layer. A modulation may for example be done directly on the single video signal per pixel without the need of having a special LED hardware inside the signage display. Therefore, no special signage display is needed (although the apparatus disclosed here can be built inside such a display).

The modulation scheme can for example use blocks of pixels together to transport a single bit of data. As, according to some embodiments, the data rate is not very high, the distance of a camera to the signage display can be quite large.

The watermark signal may comprise content area meta information. The content area meta information may for example be encoded according to the modulation schemes described above.

According to an embodiment, the content area meta information is encoded by means of a 2D barcode scheme, for example as a QR code. The 2D barcode scheme code can then be modulated on the content video signal by one of the modulation schemes described above.

For example, the 2D barcode area can be mapped in its entirety to the area of the content video. 2D barcodes on top of the content video signal, although being only one implementation example, may result in good robustness characteristics.

In the following embodiments it is also described a method comprising decoding a watermark signal from a display video signal, the watermark signal defining a content area within the display video signal for inserting new content within the display video signal.

Still further, in the following embodiments it is also described a method comprising encoding a watermark signal into a content video signal to obtain a display video signal, the watermark signal defining a content area within the content video signal for inserting new content into the content video signal.

In these methods, the watermark signal may be used for marking areas which can be used as virtual billboards.

Alternatively or in addition, the watermark signal may be used for marking the areas in a picture where text or other media is contained that needs to be replaced e.g. for localization purposes.

Still alternatively or in addition, the watermark signal may be used for marking the boundaries of certain areas in a picture.

Still alternatively or in addition, the watermark signal may be used as a calibration signal.

Embodiments are now explained in more detail with regard to the Figures.

Figure 1:
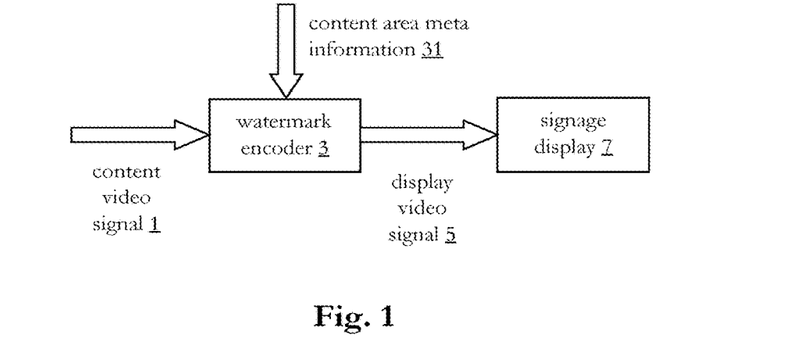
FIG. 1 schematically shows an embodiment of a watermark encoder which receives a content video signal and content area meta information.

FIG. 1 schematically shows an embodiment of a watermark encoder 3 which receives a content video signal 1 and content area meta information 31. The watermark encoder 3 encodes the content area meta information 31 and applies a visual light communication (VLC) modulation scheme to insert the content area meta information 31 into the content video signal 1 to obtain a display video signal 5. The display video signal 5 is sent to a signage display 7. The signage display 7 displays the display video signal 5 on its display screen. The encoded content area meta information 31 modulated on the content video signal 1 is not visible to a human viewer who looks at the signage display 7.

Figure 2:
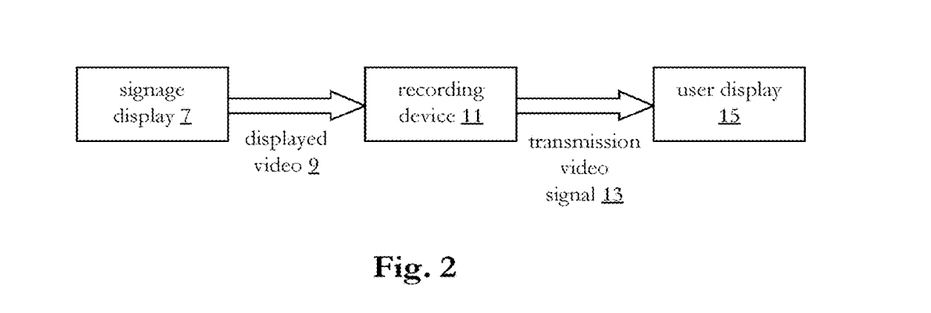
FIG. 2 schematically shows an embodiment of a signage display and a recording device which captures a displayed video output from the signage display.

FIG. 2 schematically shows an embodiment of a signage display 7 and a recording device 11 which captures a displayed video 9 output from the signage display 7. The video data captured by the recording device 11 is transmitted to a user display 15 as a transmission video signal 13. In this embodiment, the recording device is a video camera and the transmission video signal 13 is transmitted to a user display 15 by sending the recorded video data to a broadcaster (not shown in FIG. 2) which broadcasts the transmission video signal 13 to the user display 15. The recording device 11 is capable of capturing the displayed video 9 in such a way that not only an original content video signal (1 in FIG. 1) but also any content area meta information (31 in FIG. 1) modulated on the content video signal is recorder. Accordingly, the transmission video signal 13 comprises the content video signal and any data modulated on the content video signal.

In such a video recording as described with regard to FIG. 2, the quality is determined by the recording (and/or transmission) parameters at recording time even if the user display can offer a better quality. The watermark encoding according to the embodiments allows to enhance this situation by fitting billboards with means to replace their content dynamically on the display device at playback time. This is achieved by using a watermark code that combines characteristics of watermarks and 2D barcodes in order to mark the area and orientation of the billboard as well as carrying some data.

Figure 3:
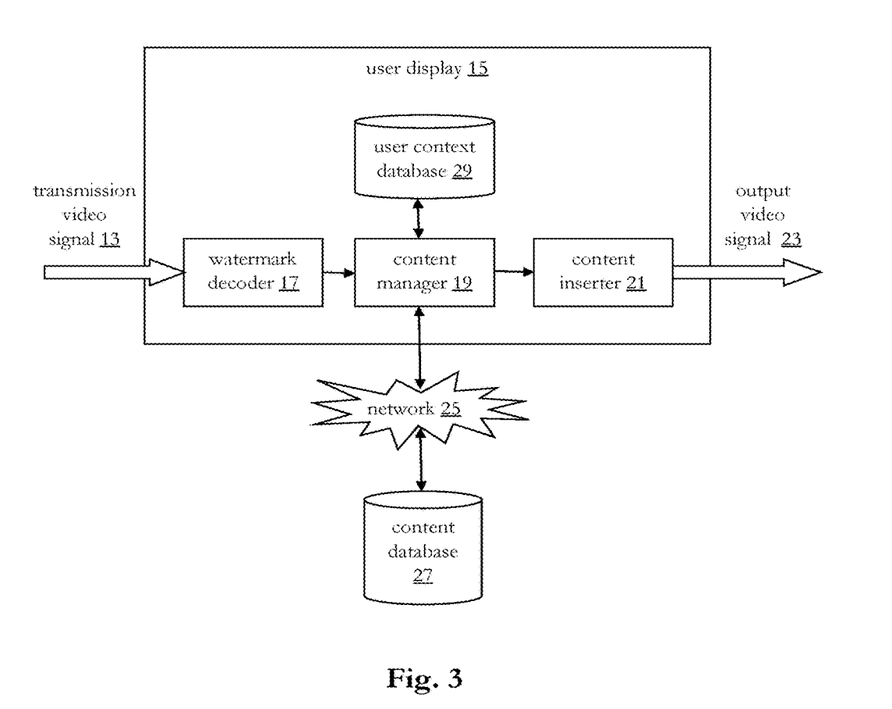
FIG. 3 schematically shows in more detail an embodiment of a user display.

FIG. 3 schematically shows in more detail an embodiment of a user display 15. The user display 15 comprises a watermark decoder 17. The watermark decoder 17 is arranged to receive a transmission video signal 13 (such as transmitted to the user display 15 according to the description in FIG. 2). The watermark decoder 17 is arranged to identify a watermark signal modulated onto a content video signal and contained in the transmission video signal 13. The watermark decoder 17 is further arranged to identify a content area in which the watermark is modulated onto the video content carried by the transmission video signal 13. The watermark decoder 17 is further arranged to read content area meta information from the data modulated onto the video signal contained in the transmission video signal 13. The watermark decoder 17 passes the extracted information to a content manager 19. The content manager 19 is connected to a user context database 29. The user context database 29 contains user context information related to one or more users of the user display 15. The content manager 19 is further connected, via a network 25, to a content database 27. The content database 27 stores objects such as advertisements which may be inserted into the video signal as insertion or replacement content. The content manager 19, based on the content area meta information and the user context information, selects replacement content from the content database 27. A content inserter 21 is arranged to insert the replacement content selected by the content manager 19 within the area defined by the watermark signal. The content inserter 21 thus produces an output video signal 23 which contains the video signal contained in the transmission video signal 13 with replaced content. The user display 15 then displays this output video signal 23 to one or more users.

Figure 4:
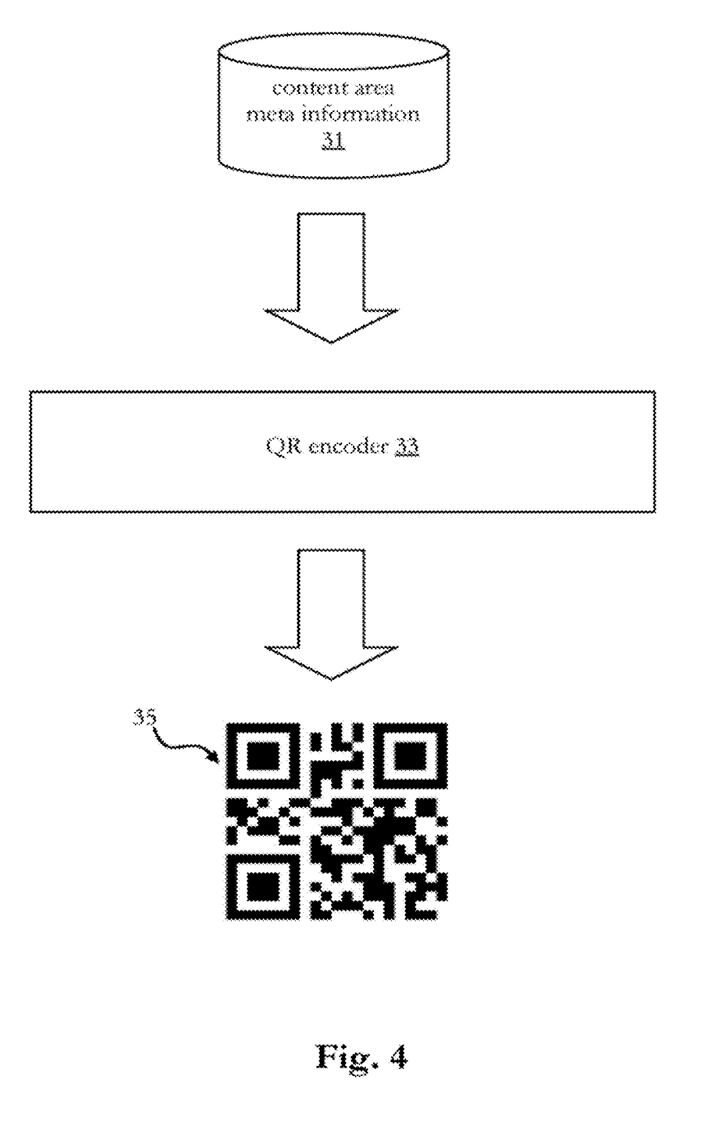
FIG. 4 schematically shows an embodiment of a 2D barcode encoder which may be used in relation with a watermark encoder.

FIG. 4 schematically shows an embodiment of a 2D barcode encoder which may be used in relation with a watermark encoder. In this embodiment the 2D barcode encoder is a QR encoder 33. The QR encoder receives content area meta information 31 and encodes this content area meta information 31 as a two-dimensional QR code 35.

Figure 5:
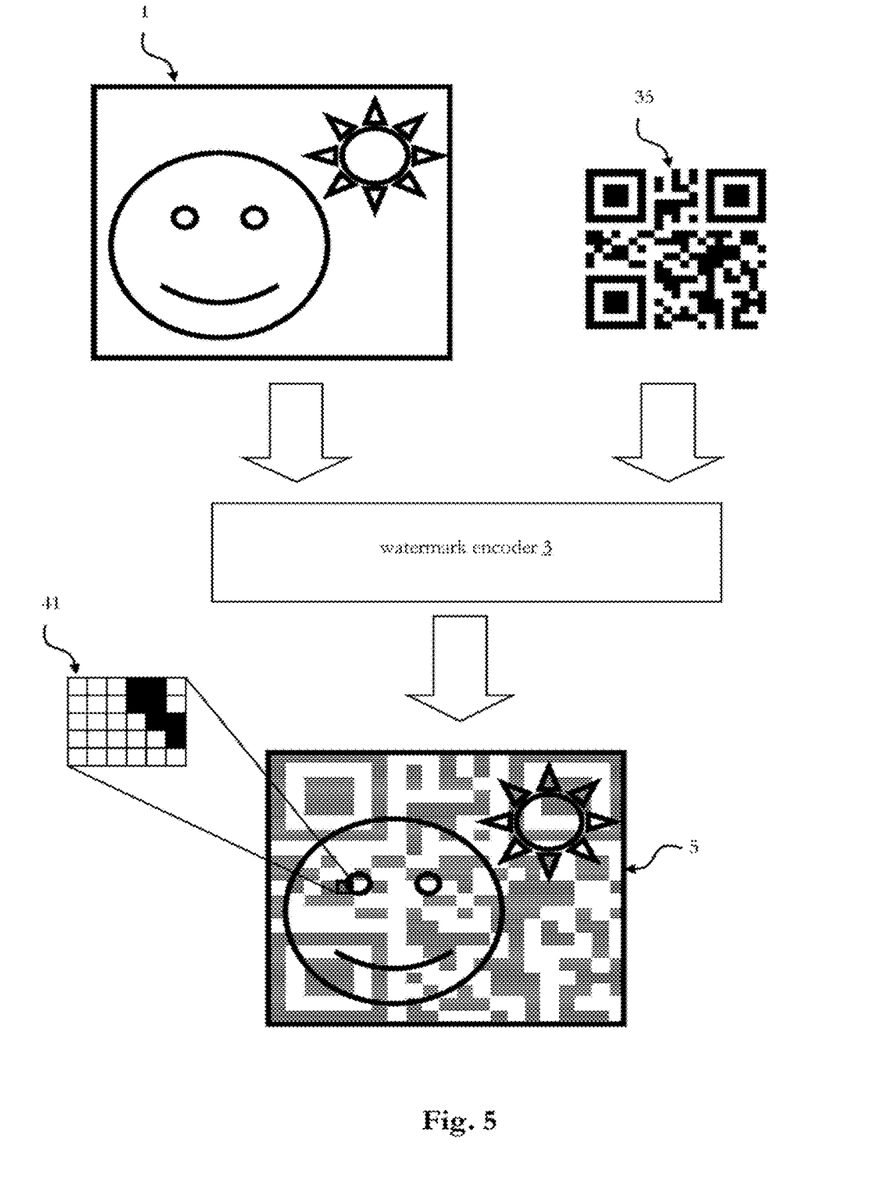
FIG. 5 schematically shows a watermark encoder which receives a content video signal and a QR code and which applies a visual light communication (VLC) modulation scheme to insert the QR code into the content video signal.

FIG. 5 schematically shows a watermark encoder 3 which receives a content video signal 1 (here, for illustrative purpose, only one video frame of the content video signal 1 is depicted in FIG. 5) and a QR code 35. The watermark encoder 3 applies a visual light communication (VLC) modulation scheme to insert the QR code 35 into the content video signal 1. Based on the visual light communication (VLC) modulation scheme, the watermark encoder 3 produces a display video signal 5 (again, for illustrative purpose, only one video frame of the display video signal 5 is depicted in FIG. 5). According to this embodiment, each QR code pixel is mapped to a block of pixels 41 of the content video signal 1. Here, in particular, one QR code pixel is mapped to 5×6=30 pixels of the content video signal 1. Using 30 content pixel for transporting only one QR code bit results in a not too high data rate which allows for high robustness. According to this embodiment, the entire area of the QR code is mapped to the entire area of the video content. This allows to make use of a maximum number of content pixels for modulating the QR code.

Figure 6:
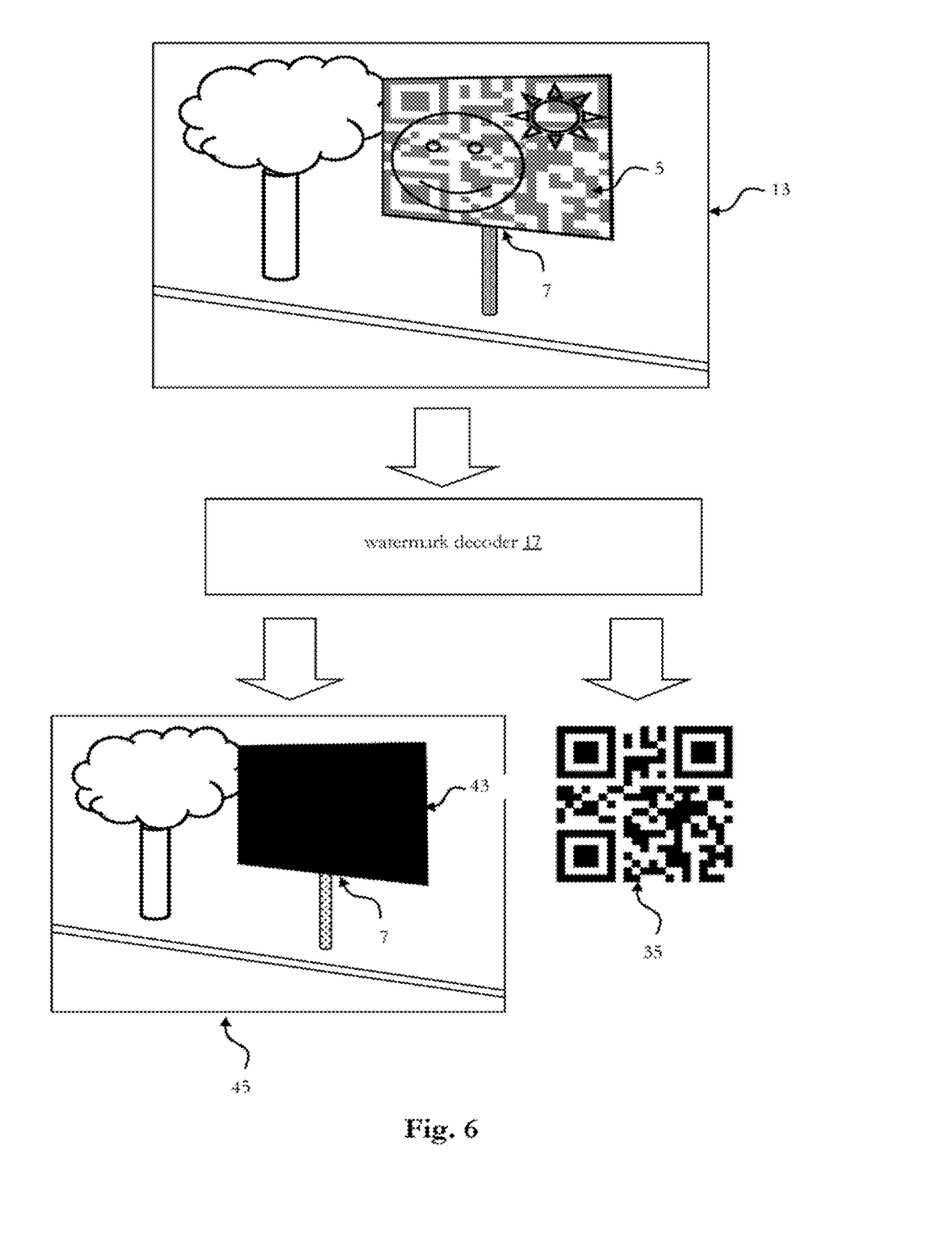
FIG. 6 schematically shows a watermark decoder which receives a transmission video signal and extracts a QR code from the transmission video signal.

FIG. 6 schematically shows a watermark decoder 17 which receives a transmission video signal 13 (again, for illustrative purpose, only one video frame of the transmission video signal 13 is depicted in FIG. 6). This transmission video signal 13 carries a camera recording of a scenery in which a signage display 7 is located. On the signage display 7 it is displayed the display video signal 5 comprising the QR code 35 as described with regard to FIG. 5. The watermark decoder 17 is arranged to determine the content area 43 defined by the QR code 35 in the transmission video signal 13. The watermark decoder 17 is further arranged to extract the QR code 35 from this content area 43 in the transmission video signal 13.

Figure 7:
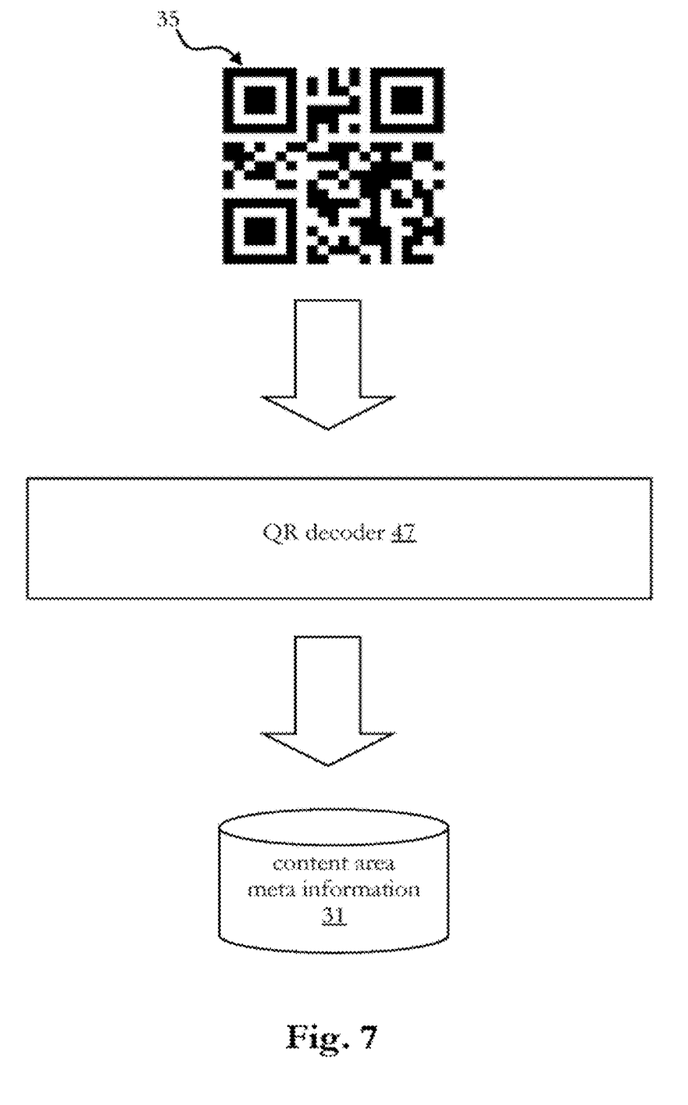
FIG. 7 schematically shows an embodiment of a 2D barcode decoder which may be used in relation with a watermark decoder.

FIG. 7 schematically shows an embodiment of a 2D barcode decoder which may be used in relation with a watermark decoder. In this embodiment the 2D barcode encoder is a QR decoder 47. The QR decoder receives a two-dimensional QR code 35 (obtained as explained with regard to FIG. 6) and decodes this two-dimensional QR code 35 to obtain content area meta information 31 coded into the two-dimensional QR code 35.

Figure 8:
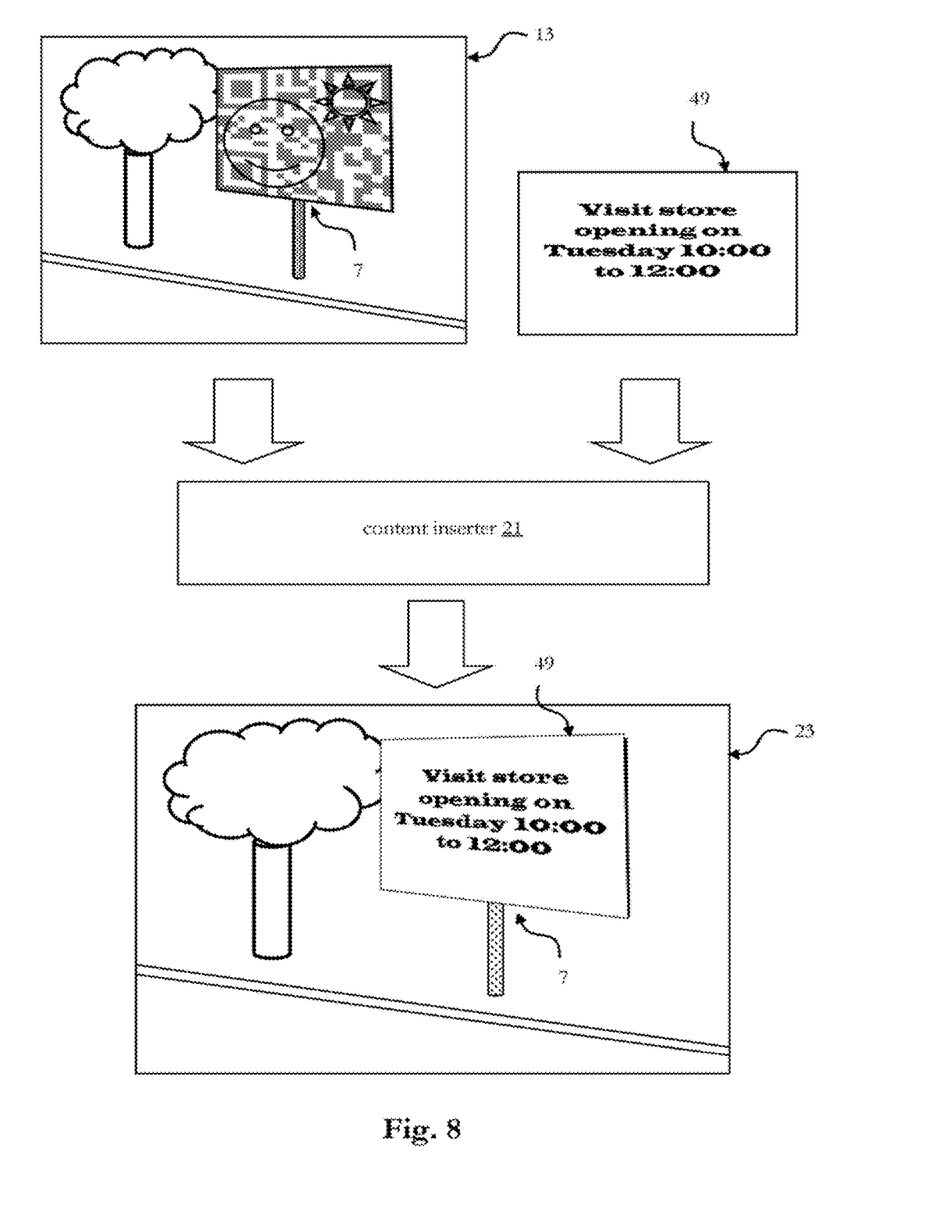
FIG. 8 schematically shows an embodiment of a content inserter.

FIG. 8 schematically shows an embodiment of a content inserter 21. The content inserter receives a transmission video signal 13 (again, for illustrative purpose, only one video frame of the transmission video signal 1 is depicted in FIG. 8). The content inserter 21 further receives replacement content 49, e.g. from a content manager (19 in FIG. 3). The content inserter 21 inserts this replacement content 49 at the content area indicated by the watermark signal (as obtained by the watermark decoder 17 in FIG. 6). The replacement content is selected based on the content area meta information 31 coded into the QR code 35 (as obtained according to FIG. 7 and the respective description) and may also be selected based on user context data obtained from a user context database (29 in FIG. 3). As a result, an output video signal 23 is obtained in which the original content in the transmission video signal 13 at the position indicated by the watermark signal is replaced by the replacement content 49.

In the transmission video signal 13 the image of the signage display 7 can thus be regarded as a virtual billboard which shows replacement content 49 as provided by a content manager located in a user display.

Figure 9:
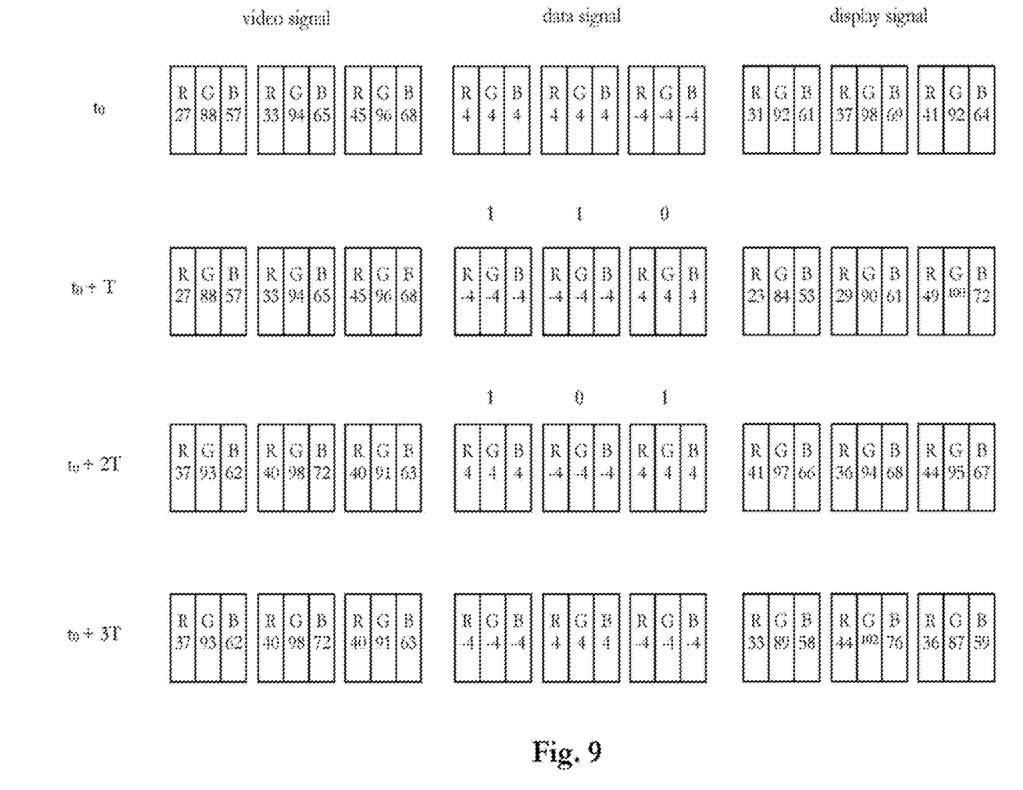
FIG. 9 schematically shows an embodiment of a visual light communication (VLC) modulation scheme which may be used to modulate data onto a content video signal.

FIG. 9 schematically shows an embodiment of a visual light communication (VLC) modulation scheme which may be used to modulate data into a content video signal. The visual light communication (VLC) modulation scheme used in this embodiment was described by Kays, Ruediger in "Visible Light Communication Using TV Displays and Video Cameras", IEEE International Conference on Consumer Electronics (ICCE) 2015, Jan. 9-12, 2015. Las Vegas, USA, ISBN 978-1-4799-7542-6. FIG. 9 shows the amplitudes of three RGB pixels of a signage display at four subsequent points in time, $t_0$, $t_0+T$, $t_0+2T$, and $t_0+3T$. Each RGB pixel comprises three subpixels R, G, B. The left column of FIG. 9 shows the original video signal. The middle column of FIG. 9 shows the data signal. The right column of FIG. 9 shows the resulting amplitudes after modulating the data signal onto the original video signal. In this embodiment, the data is modulated with a kind of manchester code in temporal direction, individually in a pair of frames. The modulation sequence is {c, −c} or {−c, c} for a logical 0 or 1, respectively. The amplitude c is the modulation amplitude which is selected small compared to the video amplitude range. The amplitude of the video signal is kept constant for $t_0$ and $t_0+T$, with T being the frame duration of the display. In this embodiment, data is modulated with c=4, equally for the three colors.

Figure 10:
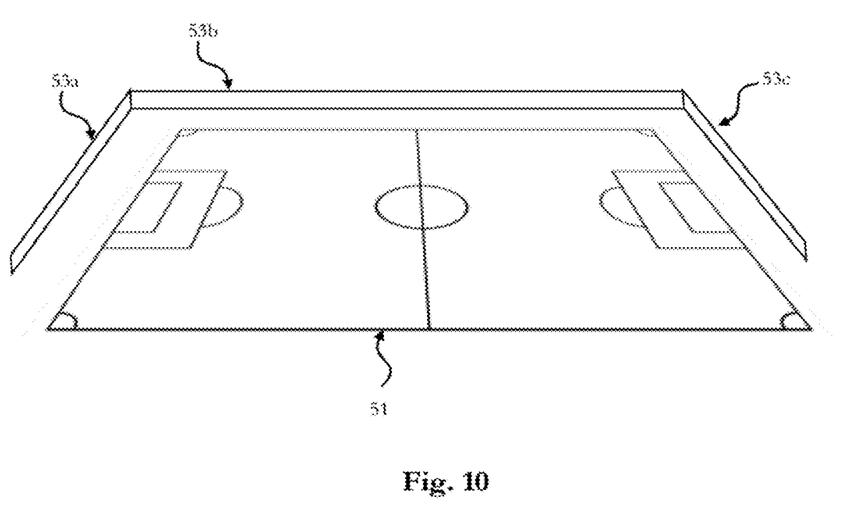
FIG. 10 schematically shows a use case of the watermark encoding/decoding.

FIG. 10 schematically shows a use case of the watermark encoding/decoding. Here traditional billboards 53a, b, c of located around a soccer field 51 are converted into virtual billboards by use of the watermark encoding/decoding techniques described above.

Figure 11:
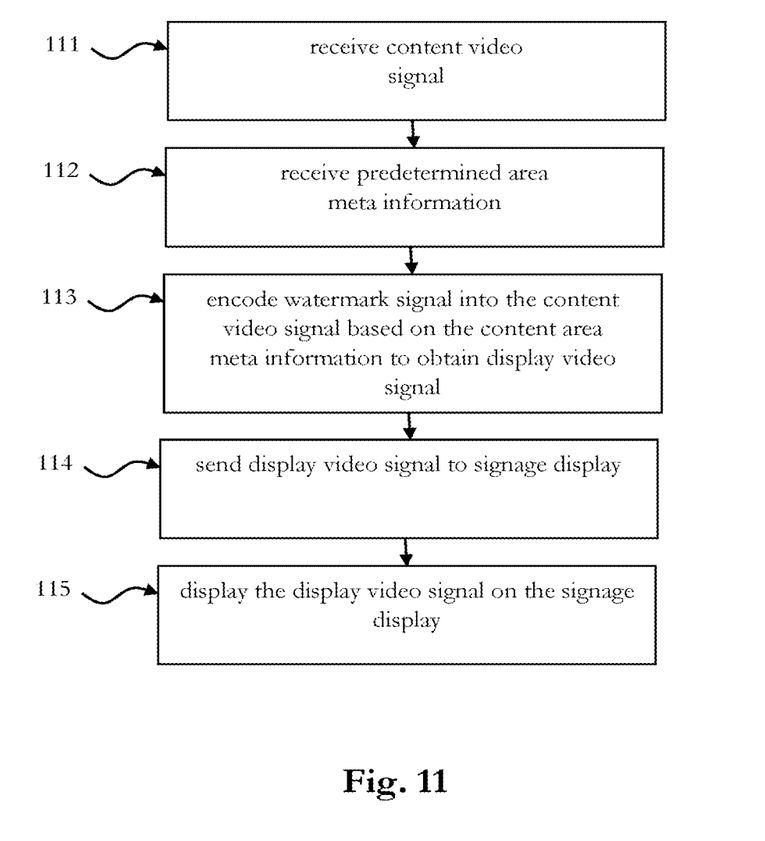
FIG. 11 shows an embodiment of a method comprising decoding a watermark signal from a transmission video signal.

FIG. 11 shows an embodiment of a method comprising encoding a watermark signal into a content video signal. At 111, a content video signal is received. At 112, content area meta information is received. At 113, a watermark signal is encoded into the content video signal based on the content area meta information to obtain a display video signal. At 114, the display video signal is sent to a signage display. At 115, the display video signal is displayed on the signage display.

Figure 12:
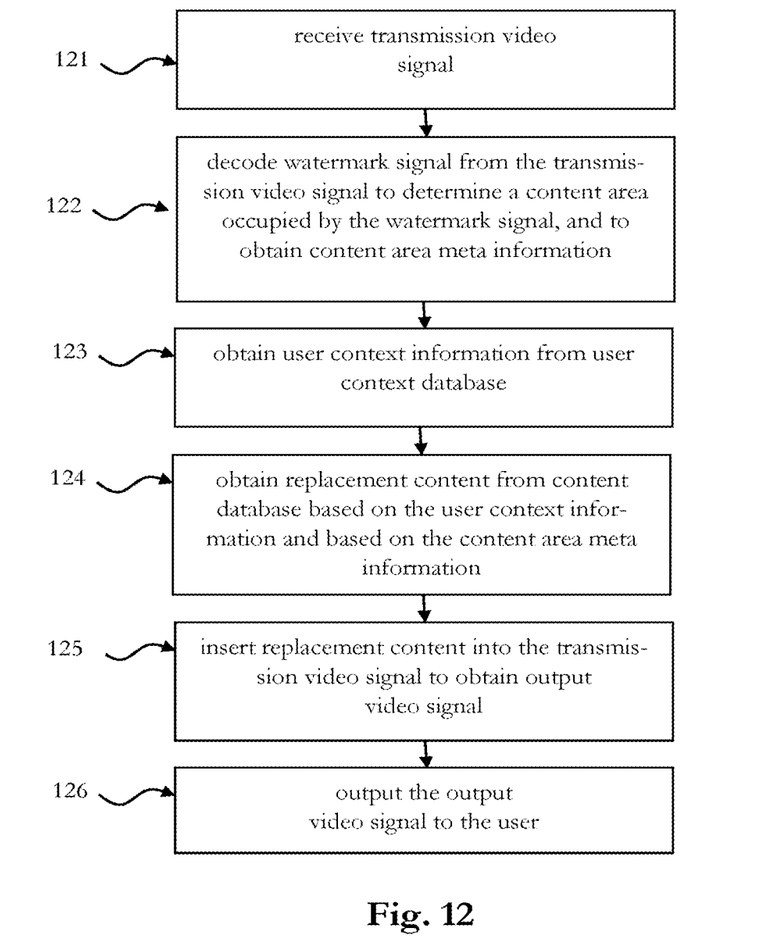
FIG. 12 shows an embodiment of a method comprising encoding a watermark signal into a content video signal to obtain a display video signal.

FIG. 12 shows an embodiment of a method comprising decoding a watermark signal from a transmission video signal to obtain a display video signal. At 121, a transmission video signal is received. At 122, a watermark signal is decoded from the transmission video signal to determine a content area occupied by the watermark signal, and to obtain content area meta information. At 123, user context information is obtained from a user context database. At 124, replacement content is obtained from a content database based on the user context information and based on the content area meta information. At 125, the replacement content is inserted into the transmission video signal to obtain output video signal. At 126, the output video signal is output to a user. The method may for example be implemented in any video playback device, such as user display device 15 in FIG. 3.

Other Use Cases

In the embodiments described above, a use of the watermark encoding and the watermark decoding was described which relates to signage displays and virtual billboards. However, the watermark encoding and the watermark decoding may also be applied in other use cases:

The watermark signal may for example be used for marking the areas in a picture where text or other media is contained that needs to be replaced e.g. for localization purposes. This may be helpful in situations where "language versions" of a movie are to be produced by replacing the text appearing in the movie (e.g. the movie title) by different language versions. By marking the areas where such media occurs that needs to be replaced for a certain localized version of the movie, this process can be moved from manual editing that creates a new video signal for the entire movie to an automatic process done on the display device. The replacement content pieces may be kept in a content database as described above so that they are available electronically. These pieces even could be rendered on the display device given all the resources (in the text case, this would be the text in the target language, a font, and the background to use).

Still further, the watermark signal may for example be used for marking the boundaries of certain areas in a picture. In modern movie creating processes, sometimes object and other area boundaries are known from the production process, e.g. areas that have been recorded in reality vs. areas that have been computer-generated, moving vs. static areas, all the object boundaries for computer-generated movies, known distances of objects to the camera, etc. These boundaries can also be coded as data in the movie using the watermark encoding described in the embodiments above. If necessary, a higher data rate may be achieved using 3D codes. The encoded data can then be used e.g. by compression algorithms in order to compress a movie better or by picture enhancing algorithms in a display device to mitigate interlace effects.

Still further, the watermark signal may for example be used as a calibration signal. The watermark encoding can for example be used to enhance the overall picture by having the original ad displaying some pre-defined pattern that the image enhancement algorithm knows. In order to allow this, the data that is encoded in the picture may contain the content video signal (or at least one frame). A picture enhancement system now knows both a) the original content video signal, and b) the recorded display signal (minus the modulation). This information can then be used to enhance the entire recorded signal.

It should further be noted that this disclosure also envisages a system that is comprised of a watermark encoder such as disclosed with regard to FIG. 1 and a user display device comprising a watermark decoder such as disclosed with regard to FIG. 2 and FIG. 3.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

All units and entities described in this specification and claimed in the appended claims can, if not stated otherwise, be implemented as integrated circuit logic, for example on a chip, and functionality provided by such units and entities can, if not stated otherwise, be implemented by software.

It should be recognized that the embodiments describe methods with an exemplary ordering of method steps. The specific ordering of method steps is however given for illustrative purposes only and should not be construed as binding. For example the ordering of 111 and 112 in the embodiment of FIG. 11 may be exchanged.

It should also be recognized that the division of the user display into units 17, 19, 21, and 29 according to the embodiment of FIG. 3 is only made for illustration purposes and that the present disclosure is not limited to any specific division of functions in specific units. For instance, some or all of the watermark decoder 17, the content manager 19, and the content inserter 21 could be implemented by a respective programmed processor, field programmable gate array (FPGA) and the like.

It should also be noted that the location of the units given in the embodiments is not meant as binding. For example the user context database 29 is shown in FIG. 3 as part of the user display device 15. The skilled person will recognize that this user context database 29 may as well be located outside the user display device, for example on a server in the Internet or in the cloud. Further, in the embodiment of FIG. 3 the watermark decoder 17 is shown as part of a user display 15. The skilled person will readily appreciate that the watermark decoder 17 may alternatively be located outside of the user display 15, for example in a set top box. The watermark decoder 17 may also be realized as a cloud service. In this case the user display 15 can send parts of the incoming transmission video to the cloud service and the cloud service performs the tasks of the watermark decoder 17.

Likewise the content database 27 described in the embodiment of FIG. 3 can be located with a single server, or it may be distributed over several servers at different location. The content database 27 may for example also be realized as a cloud database.

Other modifications as such described above are with the scope of the appended claims.

Note that the present technology can also be configured as described below:

(1) An apparatus comprising a watermark decoder arranged for decoding a watermark signal from a transmission video signal, the watermark signal defining a content area within the transmission video signal for inserting new content within the transmission video signal.

(2) The apparatus of (1), further comprising a content inserter arranged for inserting the new content at the content area defined by the watermark signal.

(3) The apparatus of (1) or (2) wherein the watermark signal further comprises content area meta information.

(4) The apparatus of anyone of (1) to (3) in which the watermark decoder applies a visual light communication demodulation scheme.

(5) The apparatus of anyone of (1) to (4) further comprising a content manager arranged for selecting the new content based on the content area meta information.

(6) The apparatus of anyone of (3) to (5) wherein the content area meta information is encoded as a 2D barcode.

(7) The apparatus of anyone of (5) to (6) wherein the content manager is further arranged for selecting the new content based on user context information.

(8) An apparatus comprising a watermark encoder arranged for encoding a watermark signal into a content video signal to obtain a display video signal, the watermark signal defining a content area within the content video signal for inserting new content into the content video signal.

(9) The apparatus of (8) in which the watermark decoder applies a visual light communication demodulation scheme.

(10) The apparatus of anyone of (8) or (9) wherein the watermark signal comprises content area meta information.

(11) The apparatus of (10) wherein the content area meta information is encoded as a 2D barcode.

(12) The apparatus of anyone of (8) to (11) wherein the new content is an advertisement.

(13) A method comprising decoding a watermark signal from a transmission video signal, the watermark signal defining a content area within the transmission video signal for inserting new content within the transmission video signal.

(14) A method comprising encoding a watermark signal into a content video signal to obtain a display video signal, the watermark signal defining a content area within the content video signal for inserting new content into the content video signal.

(15) The method of (14), wherein the watermark signal is used:
the watermark signal is used for marking areas which can be used as virtual billboards; and/or
the watermark signal is used for marking the areas in a picture where text or other media is contained that needs to be replaced e.g. for localization purposes; and/or
the watermark signal is used for marking the boundaries of certain areas in a picture; and/or
the watermark signal is used as a calibration signal.

The present application claims priority to European Patent Application 15155994.5 filed by the European Patent Office on 20 Feb. 2015, the entire contents of which being incorporated herein by reference.

The invention claimed is:

1. An apparatus, comprising:
a processor configured to
receive a transmission video signal depicting a scene that includes a display that displays a content video signal and a watermark signal overlayed on the content video signal;
extract the watermark signal from a plurality of frames of the transmission video signal the watermark signal defining a boundary of a content area within each frame of the plurality of frames of the transmission video signal for inserting new content; and
insert the new content in the area within the content area of each frame of the plurality of frames of the transmission video signal.

2. The apparatus of claim 1, wherein the watermark signal comprises content area meta information.

3. The apparatus of claim 2, wherein the processor is configured to select the new content based on the content area meta information.

4. The apparatus of claim 3, wherein the processor is configured to select the new content based on user context information.

5. The apparatus of claim 2, wherein the content area meta information is encoded as a two-dimensional (2D) barcode.

6. The apparatus of claim 2, wherein the processor is further configured to
obtain user context information form a user context database, and
obtain the new content from a content database based on the user context information and the content area meta information.

7. The apparatus of claim 1, wherein the processor is configured to apply a visual light communication demodulation scheme.

8. The apparatus of claim 1, wherein the processor is further configured to output the video signal to a user via a display apparatus.

9. The apparatus of claim 1, wherein the watermark signal is overlayed on a surface of an object depicted in the transmission video signal.

10. The apparatus of claim 1, wherein the watermark signal overlayed on the content video signal fills an entirety of the content area.

11. The apparatus of claim 1, wherein the processor is further configured to output, as a new video signal for display to a user, the transmission video signal including the inserted new content.

12. An apparatus, comprising:
a processor configured to
encode a watermark signal into a plurality of frames of a content video signal so that the watermark signal overlays the content video signal, the watermark signal defining a boundary of a content area within each frame of the plurality of frames of the content video signal for inserting new content into a transmission video signal depicting a scene that includes a display that displays the content video signal, and
transmit the content video signal.

13. The apparatus of claim 12, wherein the processor is configured to apply a visual light communication demodulation scheme.

14. The apparatus of claim 12, wherein the watermark signal comprises content area meta information.

15. The apparatus of claim 14, wherein the content area meta information is encoded as a two-dimensional (2D) barcode.

16. The apparatus of claim 12, wherein the new content is an advertisement.

17. The apparatus of claim 12, wherein the watermark signal overlays a surface of an object depicted in the transmission video signal.

18. The apparatus of claim 12, wherein the watermark signal overlayed on the content video signal fills an entirety of the content area.

19. A method comprising:
receiving a transmission video signal depicting a scene that includes a display that displays a content video signal and a watermark signal overlayed on the content video signal;
extracting the watermark signal from a plurality of frames of the transmission video signal the watermark signal defining a boundary of a content area within each frame of the plurality of frames of the transmission video signal for inserting new content; and
inserting the new content in the area within the content area of each frame of the plurality of frames of the transmission video signal.

20. The method of claim 19, further comprising:
outputting the video signal to a user via a display apparatus.

21. The method of claim 19, wherein the watermark signal comprises content area meta information.

22. The method of claim 21, further comprising:
obtaining user context information form a user context database; and obtaining the new content from a content database based on the user context information and the content area meta information.

23. The method of claim 19, wherein the watermark signal is overlayed on a surface of an object depicted in the transmission video signal.

24. The method of claim 19, wherein the watermark signal overlayed on the content video signal fills an entirety of the content area.

25. The method of claim 19, further comprising:
outputting, as a new video signal for display to a user, the transmission video signal including the inserted new content.

26. A method comprising:
encoding a watermark signal into a plurality of frames of a content video signal so that the watermark signal overlays the content video signal, the watermark signal defining a boundary of a content area within each frame of the plurality of frames of the content video signal for inserting new content into a transmission video signal depicting a scene that includes a display that displays the content video signal; and
transmitting the content video signal.

27. The method of claim 26, wherein the watermark signal is used:
for marking areas which can be used as virtual billboards; and/or
marking the areas in a picture where text or other media is contained that needs to be replaced e.g. for localization purposes; and/or
marking the boundaries of certain areas in a picture; and/or
as a calibration signal.

28. The method of claim 26, wherein the watermark signal overlays a surface of an object depicted in the transmission video signal.

29. The method of claim 26, wherein the watermark signal overlayed on the content video signal fills an entirety of the content area.

* * * * *